United States Patent [19]

Goodwin et al.

[11] Patent Number: 5,166,277
[45] Date of Patent: Nov. 24, 1992

[54] HYDROGENATION OF UNSATURATION IN LOW MOLECULAR WEIGHT DIENE POLYMERS

[75] Inventors: Daniel E. Goodwin, Katy; Carl L. Willis, Houston, both of Tex.

[73] Assignee: Shell Oil Company, Houston, Tex.

[21] Appl. No.: 785,715

[22] Filed: Oct. 31, 1991

[51] Int. Cl.$^5$ .............................................. C08F 8/04
[52] U.S. Cl. ................................. 525/338; 525/332.8; 525/332.9; 525/333.1; 525/333.2; 525/339; 525/366; 525/370
[58] Field of Search ............. 525/338, 334, 366, 370

[56] References Cited

U.S. PATENT DOCUMENTS

| Re. 27,145 | 6/1971 | Jones | 260/880 |
|---|---|---|---|
| 3,415,898 | 12/1968 | Walker | 260/683.9 |
| 3,994,868 | 11/1976 | Inomata et al. | 526/26 |
| 4,020,125 | 4/1977 | Suzuki et al. | 260/859 R |
| 4,028,485 | 6/1977 | Poloso et al. | 528/486 |
| 4,039,593 | 8/1977 | Kamienski et al. | 260/635 E |
| 4,507,430 | 3/1985 | Shimada et al. | 524/839 |
| 4,560,817 | 12/1985 | Bobsein et al. | 525/339 |
| 4,595,749 | 6/1986 | Hoxmeier | 528/483 |
| 4,855,509 | 8/1989 | Dave et al. | 518/621 |
| 4,866,120 | 9/1989 | Rudnick et al. | 524/849 |
| 4,980,421 | 12/1990 | Teramoto et al. | 525/332.8 |
| 5,039,755 | 8/1991 | Chamberlain et al. | 525/332.8 |

FOREIGN PATENT DOCUMENTS 64-43503  2/1989  Japan .

OTHER PUBLICATIONS

P. Lutz, E. Franta & P. Rempp, "An Efficient Bifunctional Lithium-Organic Initiator To Be Used In Apolar Solvents", 1982, pp. 1953-1959.

F. Bandermann, H. Speikamp & L. Weigel, "Bifunctional Anionic Initiators", Makromol. Chem., 2017-2024 (1985).

G. Bienert et al., "A Bifunctional Anionic Initiator Soluble in Polar Solvents", Makromol. Chem. 179, 551-555 (1978).

*Primary Examiner*—Bernard Lipman
*Attorney, Agent, or Firm*—Keith M. Tackett

[57] ABSTRACT

Complete hydrogenation of residual unsaturation in low molecular weight polymers containing conjugated dienes is enhanced by removal of strong lithium bases by filtering or decanting the polymer solution prior to hydrogenation.

11 Claims, No Drawings

HYDROGENATION OF UNSATURATION IN LOW MOLECULAR WEIGHT DIENE POLYMERS

BACKGROUND OF THE INVENTION

This invention relates to hydrogenation of residual unsaturation in conjugated diene homopolymers and copolymers. The hydrogenation process is most useful for removing residual unsaturation from low molecular weight polymers.

Anionic polymerization of conjugated dienes with lithium initiators, such as sec-butyllithium, and hydrogenation of residual unsaturation has been described in many references including U.S. Pat. No. Re. 27,145. Reduction of residual olefinic unsaturation by at least 95% is readily accomplished for high molecular weight polymers with nickel catalysts while reduction beyond 99% is difficult.

Recent experiments with low molecular weight polymers containing conjugated diene units have shown that the effectiveness of the nickel catalysts for hydrogenating the polymers decreases as molecular weight of the polymer decreases. Furthermore, it is known from U.S. Pat. Nos. 3,994,868 and 4,866,120 that significant hydrogenation of low molecular weight hydrocarbon polymers having two or more terminal hydroxyl groups per molecule could not be achieved using nickel catalysts. Both patents assert that complete hydrogenation was achieved with palladium catalysts, and the '868 patent further asserts superior results using ruthenium catalysts.

Low molecular weight polymers containing saturated dienes are useful a tackifying resins in making adhesives. Such polymers having two or more terminal hydroxyl groups are particularly useful in coating applications such as described in U.S. Pat. Nos. 4,039,593 and 4,507,430 which utilities are incorporated by reference herein.

Incomplete hydrogenation of the low molecular weight polymers containing conjugated diene units makes the polymers prone to degradation by oxidative and crosslinking mechanisms that are often induced by heat or ultraviolet light.

It is an object of the present invention to provide complete hydrogenation of residual olefinic unsaturation in diene polymers using nickel catalysts, particularly diene polymers having terminal hydroxyl groups.

SUMMARY OF THE INVENTION

Applicants have discovered that complete hydrogenation of low molecular weight diene polymers with nickel catalysts is achieved by removing fine particles from the polymer solution prior to hydrogenation. The fine particles typically comprise ionic lithium residues, particularly strong lithium bases such as lithium alkoxides and lithium hydroxides, and hinder conventional nickel catalyst hydrogenation processes. The fine particles are readily removed from solutions containing low molecular weight polymers by filtering or decanting the solutions prior to hydrogenation.

DETAILED DESCRIPTION OF THE INVENTION

Anionic polymerization of conjugated diene hydrocarbons with lithium initiators is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

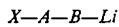

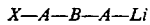

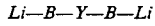

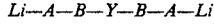

wherein B represents polymerized units of one or more conjugated diene hydrocarbons such as butadiene or isoprene, A represents polymerized units of one or more vinyl aromatic compounds such as styrene, X is the residue of a monolithium initiator such as sec-butyllithium, and Y is the residue of a dilithium initiator such as the diadduct of sec-butyllithium and m-diisoprenylbenzene. Other structures, including those pertaining to polylithium initiators or random units of styrene and a conjugated dine, generally have less practical utility although known in the art.

The anionic polymerization of the conjugated diene hydrocarbons is typically controlled with structure modifiers such as diethylether or glyme (1,2-diethoxyethane) to obtain any desired amount of residual unsaturation in the polymer backbone (1,4-addition) or in side chains dangling from the backbone (1,2-addition and 3,4-addition). As described in Re 27,145 which is incorporated by reference herein, the number of side chains in a specific structure for a conjugated diene polymer or copolymer can greatly affect elastomeric properties after hydrogenation. Thus, the amount of residual unsaturation in the backbone or in side chains prior to hydrogenation is often established by desired polymer properties which limit the amount of ether present during anionic polymerization. An equal mix of backbone and pendant unsaturation prior to hydrogenation is preferred, and can be achieved during polymerization with about 10% by volume of diethylether or about 1000 ppm of glyme.

Dilithium initiation with the diadduct of sec-butyllithium and m-diisoprenylbenzene also requires presence of an ether such as diethylether or glyme, or else monolithium initiation is achieved. The ether is typically present during anionic polymerization as discussed above, and the amount of ether typically needed to obtain specific polymer structures has been sufficient to provide dilithium initiation.

Anionic polymerization is often terminated by addition of water to remove the lithium as lithium hydroxide (LiOH) or an alcohol (ROH) to remove the lithium as a lithium alkoxide (LiOR). When desired, the living polymer chains are terminated with polar groups such as hydroxyl groups by reacting the living polymer with compounds such as ethylene oxide prior to removal of the lithium by addition of water or an alcohol.

The living polymer arms may also be coupled by addition of a polymerizable coupling agent such as divinylbenzene prior to removal of the lithium such as by the addition of water or an alcohol. Coupling with non-polymerizable coupling agents such as dibromomethane and silicon tetrachloride results in formation of lithium salts and is generally practiced with high molecular weight polymers.

Strong lithium bases such as LiOR or LiOH are readily removed as fine particles from solutions containing low molecular weight diene polymers by conventional separation methods such as filtering or decanting. Polymers produced from living polymers having number average molecular weights greater than about 20,000 prior to coupling or termination will be more viscous and less amenable to removal of fine particles. Decanting is preferred because of the combination of high removal efficiency and low equipment costs although filtering would reduce process time.

Complete hydrogenation of the low molecular weight polymers after removal of fine particles is readily achieved with the nickel catalysts described in U.S. Pat. No. Re. 27,145 which is incorporated by reference herein. The preferred nickel catalyst is a mixture of nickel 2-ethylhexanoate and triethylaluminum described in more detail below.

DETAILED DESCRIPTION OF PREFERRED EMBODIMENTS

Complete hydrogenation of linear, low molecular weight homopolymers of isoprene or butadiene has been achieved with conventional nickel catalysts after filtering or decanting to remove lithium methoxide particles. Such polymers are liquid at ambient temperature if the polymer has sufficient side chains to reduce crystallinity and the number average molecular weight of the polymer ranges between 1,000 and 20,000 as measured by gel permeation chromatography. As shown in the following examples, hydrogenation was greatly enhanced by removal of the lithium methoxide formed by either addition of methanol or addition of ethylene oxide and then methanol.

EXAMPLE 1

A solution of 800 grams of cyclohexane and 0.05 moles of sec-butyllithium was prepared in a flask in a glove box at ambient temperature and pressure. Isoprene was then added to the solution in two increments of 100 grams (200 grams total) and allowed to polymerize for 1 to 1.5 hours following addition of each increment. The polymerization was then terminated by addition of methanol. The number average molecular weight of the isoprene homopolymer in the solution, as determined by gel permeation chromatography (GPC), was 3400. The polymer solution was then filtered through a Whatman 541 filter which retains particles having diameters greater than 20-25 microns.

The clear polymer solution was pressured into a one gallon stainless steel autoclave and sparged with high-pressure hydrogen. The autoclave was then heated and filled with hydrogen to a pressure of 750 psig and a temperature of 40° C. A solution containing a previously prepared nickel catalyst was then added to the autoclave from a pressure bomb to give a nickel concentration of 130 ppm in the polymer solution. The nickel catalyst wa prepared by reacting nickel 2-ethylhexanoate with triethylaluminum in cyclohexane in amounts sufficient to give a ratio of 2.6 moles of aluminum to 1 mole of nickel.

Upon addition of both the hydrogen and the nickel catalyst, the temperature of the autoclave rose 10° C. within several minutes and the pressure declined showing rapid hydrogenation of residual unsaturation in the polymer. Hydrogen uptake and solution temperature were measured and plotted during the reaction. When the solution temperature indicated substantially complete hydrogenation after 45 minutes of reaction, the autoclave was heated to 82° C. and a sample was drawn for analysis. The sample of the solution of hydrogenated polyisoprene was cast into a film for measurement of unsaturation by infrared spectral analysis. The infrared spectra of the hydrogenated polyisoprene film did not display peaks corresponding to residual carbon-carbon unsaturation.

EXAMPLE 2 (COMPARISON)

Example 1 was essentially repeated without filtration prior to hydrogenation. The nickel catalyst solution was prepared in a similar manner with a total nickel concentration of 200 ppm. Furthermore, hydrogenation was allowed to continue for three hours in the absence of a rise in autoclave temperature. Samples of the polyisoprene solution were taken before and after hydrogenation and cast into films for infrared analysis. The infrared spectra showed little or no change in the level of unsaturation which remained in the polymer.

EXAMPLE 3

A solution of 800 grams of cyclohexane and 0.1 moles of sec-butyllithium was prepared in a flask in a glove at ambient temperature and pressure. Isoprene was then added to the solution in a single charge of 200 grams and allowed to polymerize for 2 hours. The polymerization was then terminated by addition of 5.5 mililiters of methanol. The yellow polymer solution was then filtered through a Whatman 541 filter which collected a yellowish precipitate and left a clear, colorless solution. The number average molecular weight of the isoprene homopolymer in the solution, as determined by gel permeation chromatography (GPC), was 1400.

The clear polymer solution was pressured into a one gallon stainless steel autoclave and sparged with high-pressure hydrogen. The nickel catalyst of Example 1 was then added to the autoclave to give a nickel concentration in the polymer solution of 200 ppm. The autoclave was then heated and filled with hydrogen to a pressure of 750 psig and a temperature of 40° C.

Upon addition of both the hydrogen and the nickel catalyst, the pressure of the autoclave dropped 100 psig within 20 minutes. A sample was drawn for analysis after 15 minutes of hydrogenation. The infrared spectra of the hydrogenated polyisoprene sample did not display peaks corresponding to residual carbon-carbon unsaturation.

EXAMPLE 4 (COMPARISON)

Example 3 was essentially conducted with 200 grams of isoprene and 12.8 grams of sec-butyllithium without filtration prior to hydrogenation. The polyisoprene had a number average molecular weight of 952 following capping by addition of a large excess of ethylene oxide at 50° C. The lithium remained on the polymer molecules as a polymeric alkoxide. The nickel catalyst of Example 1 was then added to give a nickel concentration in the polymer solution of 250 ppm. Samples of the polyisoprene solution were taken after hydrogenation and revealed that only 15% of the residual unsaturation had been hydrogenated as measured by carbon-13 NMR.

EXAMPLE 5 (COMPARISON)

Example 3 as essentially conducted with 200 grams of isoprene and 3.2 grams of sec-butyllithium without filtration prior to hydrogenation. The polyisoprene had a number average molecular weight of 4,600 following capping with 11.5 grams of ethylene oxide at 55° C. and removal of lithium by addition of 3 mililiters of methanol. The nickel catalyst of Example 1 was then added to give a nickel concentration in the polymer solution of 250 ppm. Hydrogenation was allowed to continue for three hours after initial heating to 82° C. Samples of the polyisoprene solution were taken after hydrogenation and measured for residual unsaturation by infrared analysis, ozonolysis, and carbon-13 NMR. The infrared spectra showed that 75% of the residual unsaturation had been hydrogenated (which was consistent with 72% hydrogenation measured by ozonolysis and 64% hydrogenation measured by carbon-13 NMR).

EXAMPLE 6

A solution of 401 pounds of cyclohexane, 60.5 pounds of diethylether, and 19.6 pounds (15 moles) of sec-butyllithium was prepared in a 100 gallon stainless steel reactor. The solution was heated to 30°–35° C. and then reacted with 2.7 pounds of diisopropenylbenzene for 30 minutes to form a lithium diinitiator. A single charge of 66 pounds of 1,3-butadiene was then added to the solution (at 42° C.) and allowed to polymerize for 12 minutes (final solution temperature of 82° C.). The number average molecular weight of the butadiene homopolymer in the solution, as determined by gel permeation chromatography (GPC), was 6,000. The polymer contained both backbone saturation (59%) and side chain unsaturation (41%). The polymer solution was then reacted with 8 pounds of ethylene oxide at 77° C. for two hours. The reaction was terminated with 15 moles of methanol. The hydroxyl terminated butadiene homopolymer sat undisturbed in solution until a white precipitate settled to the bottom. Then the clear polymer solution was decanted under pressure into another stainless steel reactor.

The clear polymer solution was sparged at 65° C. with hydrogen for 40 minutes. The reactor was then filled with hydrogen to a pressure of 750 psig. The nickel catalyst of Example 1 was then added to the reactor to give an initial nickel concentration of 100 ppm in the polymer solution.

Upon addition of both the hydrogen and the nickel catalyst, the temperature of the reactor rose to 86° C. within 15 minutes and the pressure declined showing rapid hydrogenation of residual unsaturation in the polymer. Hydrogenation continued with periodic addition of the nickel catalyst as shown in Table 1. After 15 minutes, the reaction temperature ranged from 86° C. to 89° C. Samples of the hydroxyl terminated butadiene homopolymer were taken at various times for measurement of residual unsaturation as shown in Table 1. Residual unsaturation was measured by ozonolysis and the results are reported in Table 1 as the degree of hydrogenation.

TABLE 1

| SAMPLE TIME (MIN) | NICKEL (PPM) | HYDROGENATION (%) |
|---|---|---|
| 15 | 100 | 67.2 |
| 30 | 100 | 67.5 |
| 37 | 180 | NA |
| 67 | 180 | 84.2 |
| 82 | 180 | 85.7 |
| 88 | 260 | NA |
| 118 | 260 | 88.8 |
| 133 | 260 | 89.9 |
| 141 | 340 | NA |
| 171 | 340 | 91.4 |
| 186 | 340 | 90.2 |
| 196 | 420 | NA |
| 270 | 500 | 97.0 |
| 300 | 580 | 97.4 |

EXAMPLE 7 (COMPARISON)

Example 6 was essentially repeated with 18.3 pounds of sec-butyllithium (14.9 moles of active butyllithium) without decanting to remove fine particles prior to hydrogenation. The number average molecular weight of the butadiene homopolymer was 5,300 prior to reaction with 7.5 lbs of ethylene oxide for 1 hour. The reaction was terminated with 480 grams of methanol (15 moles). The nickel catalyst solution was prepared and added in a similar manner to give an initial nickel concentration of 200 ppm in the polymer solution. Hydrogenation continued with additional amounts of the nickel catalyst as shown in Table 2. Samples of the hydroxyl terminated butadiene homopolymer were taken during and after hydrogenation and measured for degree of hydrogenation by ozonolysis. Results are shown in Table 2.

TABLE 2

| SAMPLE TIME (MIN) | NICKEL (PPM) | HYDROGENATION (%) |
|---|---|---|
| 15 | 200 | 70.8 |
| 30 | 200 | 70.0 |
| 60 | 200 | 70.6 |
| 120 | 300 | 77.2 |
| 150 | 300 | 77.1 |
| 210 | 500 | 82.9 |
| 240 | 500 | 82.2 |
| 300 | 700 | 86.9 |

From the examples, it is apparent that fine particles containing strong lithium bases inhibit the hydrogenation of residual unsaturation with nickel catalysts. The particles are effectively removed by filtering or decanting the solutions of low molecular weight polymers to improve hydrogenation.

We claim:
1. A process for hydrogenating a diene polymer or copolymer, comprising the sequential steps of:
    anionically polymerizing a conjugated diene hydrocarbon with a lithium initiator in a solvent solution to form a living polymer or copolymer;
    terminating polymerization by sequential addition of one or more compounds that form fine particles of a strong lithium base selected from a group consisting of lithium alkoxides and lithium hydroxides;
    removing the fine particles of the strong lithium base from the solvent solution; and
    hydrogenating the polymer or copolymer in the solvent solution with a nickel catalyst.
2. The process of claim 1, wherein:
    the lithium initiator is the diadduct of sec-butyllithium and m-diisopropenylbenzene;
    the solvent solution contains diethylether or glyme;

the living polymer is a living homopolymer of isoprene or butadiene;

the polymerization step is terminated by sequential addition of ethylene oxide and an alcohol; and the number average molecular weight of the homopolymer is from 1,000 to 20,000.

3. The process of claim 2, wherein the alcohol is methanol.

4. The process of claim 3, wherein lithium methoxide is removed from the solvent solution by decanting the solution.

5. The process of claim 4, wherein the nickel catalyst is a mixture of triethyaluminum and nickel 2-ethylhexanoate.

6. The process of claim 1, wherein the living polymer or copolymer has a number average molecular weight less than 20,000.

7. A process for making a hydrogenated diene polymer having two terminal hydroxy groups, comprising the sequential steps of:

anionically polymerizing a conjugated diene hydrocarbon with a diadduct of sec-butyllithium and m-diisopropenylbenzene in a solvent solution containing an ether to form a living polymer having a number average molecular weight from 1,000 to 20,000 and predominantly the following structure:

$$Li-B-Y-B-Li$$

wherein each B represents polymerized units of the conjugated diene hydrocarbon and Y is the residue of the diadduct;

terminating the polymerization step by sequential addition of ethylene oxide and an alcohol which forms a lithium alkoxide;

removing the lithium alkoxide from the solvent solution; and hydrogenating the polymer in the solvent solution with a nickel catalyst.

8. The process of claim 7, wherein the living polymer is a living homopolymer of butadiene or isoprene.

9. The process of claim 8, wherein the alcohol is methanol which forms lithium methoxide.

10. The process of claim 9, wherein the lithium methoxide is removed by decanting the polymer solution.

11. The process of claim 10, wherein the nickel catalyst is a mixture of triethyaluminum and nickel 2-ethylhexanoate.

* * * * *